Sept. 14, 1926. 1,600,088

W. BURSTYN

MECHANICAL RECTIFIER

Filed June 17, 1925

Patented Sept. 14, 1926.

1,600,088

UNITED STATES PATENT OFFICE.

WALTHER BURSTYN, OF BERLIN, GERMANY.

MECHANICAL RECTIFIER.

Application filed June 17, 1925, Serial No. 37,837, and in Germany December 5, 1922.

It is well known to transform oscillatory motions into continuous, preferably rotatory, motions by means of ratchet wheel, unilateral brakes or similar mechanical rectifiers especially electrical devices for winding-up clock-works frequently consist of an electromagnet the armature of which is fitted with a self-interrupter and drives the catch of a ratchet wheel.

The purpose of my invention is to create a very simple mechanical rectifier able to operate with oscillations of very small amplitude and relatively high frequency (50 or more per second) and I accomplish this purpose by using instead of one (or two) ratchets of relatively large mass, as usual, a multitude of small ratchets every one consisting of an elastic sheet, wire or the like. Hairs or bristles of animals jointed together as brushes or pencils, are particularly suitable since their wear is surprisingly slight.

The drawing shows several examples indicating how my invention may be carried out in practice. In the drawing—

Figure 4:
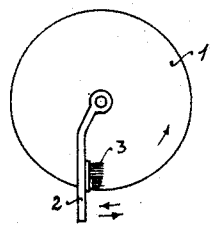
Fig. 4 is a view similar to Fig. 2 but showing a modified surface.
Figure 5:
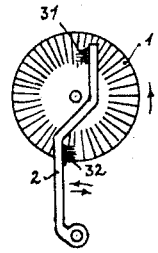
Fig. 5 is a still further modified form.

The ratchet wheel 1 may be provided with regular or irregular teeth and grooves such as may be cut with a file, or provided only with a rough or elastic surface or covered with india-rubber as shown in Fig. 4.

Figure 1:
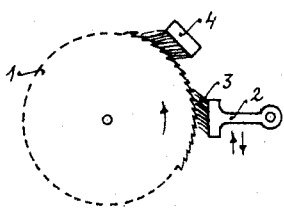
Figure 1 shows a diagrammatic side view of a ratchet wheel and operating lever.
Figure 2:
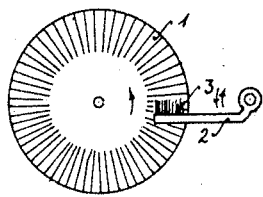
Fig. 2 is a similar view showing a modified form.
Figure 3:
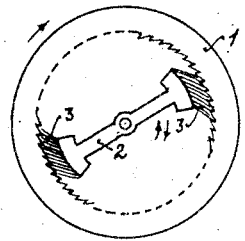
Fig. 3 is a similar view of a further modified form.
Figure 6:
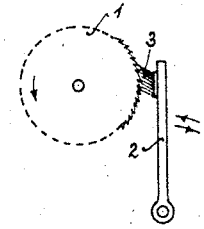
Fig. 6 is a side view similar to Fig. 1.

The cogged or rough surface of the ratchet wheel may be provided on the outside as shown in Figs. 1 and 6 or on the inside as shown in Fig. 3. Also in order to save space and provide a thin wheel, the grooves are provided on the flat side face as shown in Figs. 2, 5, 7 and 8.

A second fixed ratchet 4 is not essential when the inertia of the wheel 1 and the other rotating parts joined thereto is sufficiently high so that no backward movement will take place. It is, of course, possible, but generally not advantageous, to rectify both directions of the oscillating movement by means of two sets of brushes 31 and 32 fixed on the same lever 2 and, both driving the wheel 1 in the same direction at opposite phases.

The motions of the oscillating and the rotating part preferably take place parallel to one another, as indicated by the arrows. They may, the relative position of both being quite the same, also be inclined or even perpendicular against one another, the bristles thus carrying out a slanting movement as shown in Fig. 6.

The mechanical motion transformer according to the invention is suitable for transforming any mechanical vibration into a rotary motion, as for instance winding-up clockworks by the shocks of walking or driving, for sound-recording and so on. However, the chief application is the construction of a small electromotor by rectifying the vibrations of the armature of an electromagnet which is energized by an alternating or interrupted current.

Figure 7:
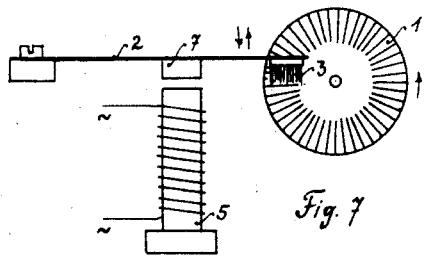
Fig. 7 is a diagrammatic view showing an electro-magnetic device.

A suitable form of electromotor is illustrated in Fig. 7. The windings of the electromagnet 5 are energized by an alternating current. Its armature 7 is attached to a spring plate or lever 2, fixed at one end and having a brush 3 on the other end. The natural frequency of this oscillating part is preferably equal to double (in the case of a polarized magnet the same) the frequency of the alternating current in order to obtain the maximum amplitude by resonance.

Figure 8:
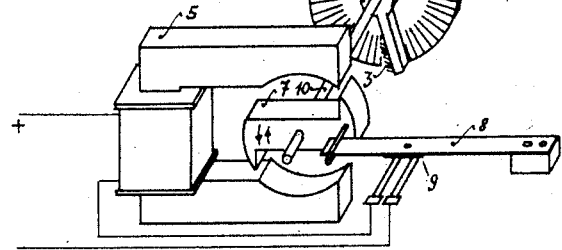
Fig. 8 is a perspective view of a modified electro-magnetic device.

When direct current is to be used or when the frequency of the armature is desired to be at times lower than that of the alternating current, the simplest way is to provide the armature with a self-interrupting device. In Fig. 8, 5 signifies the electromagnet, 7 its Z-shaped armature, 8 a plate-spring sliding into two pins of the armature and provided with the contact-plate 9 of the self-interrupter. The shaft 10 of the armature carries the double arm 2 bearing on its ends the brushes 3 and driving, as described above, the ratchet-wheel 1.

In every case instead of a simple electromagnet also a polarized magnet (as mentioned) may be used. Altogether, I do not desire to limit my invention to the precise details of construction and arrangement herein set forth, as it is obvious that various modifications may be made therein without departing from the essential features of my invention as defined in the following claims:

I claim—

1. A mechanical motion transformer comprising a wheel having a rough surface; and an oscillating driving means for the wheel, said means comprising a plurality of elastic members forming a brush adapted to contact with the rough surface of the wheel in order to rotate it.

2. A mechanical motion transformer comprising a wheel having a plurality of grooves therein; and an oscillating driving lever for the wheel, said lever comprising a plurality of elastic bristles forming a brush adapted to contact with the grooves of the wheel in order to rotate it.

In testimony whereof I affix my signature.

Dr. WALTHER BURSTYN.